Oct. 17, 1944.                    G. A. LYON                    2,360,354
                CARTRIDGE CASING AND METHOD OF MAKING SAME
                    Filed Jan. 12, 1942            4 Sheets-Sheet 1
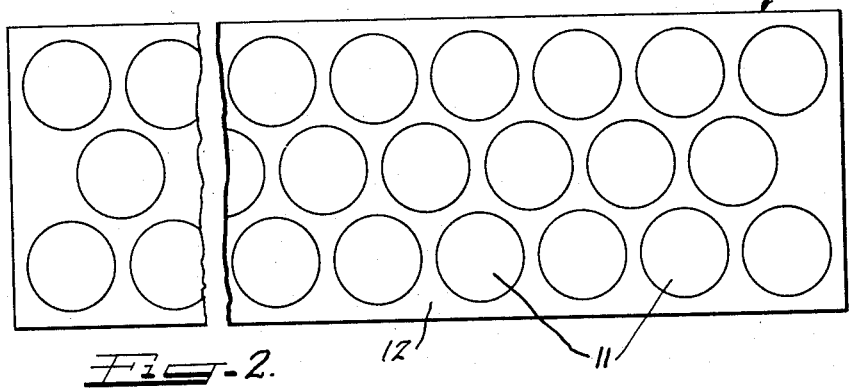
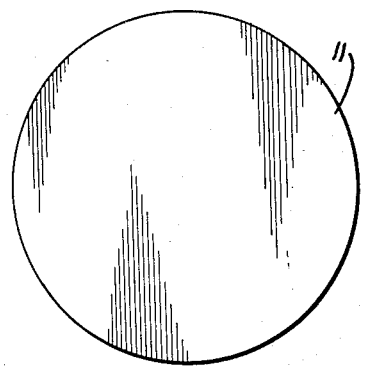
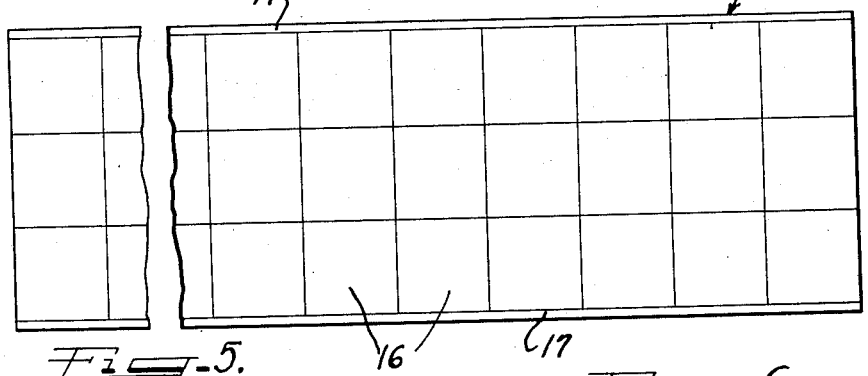
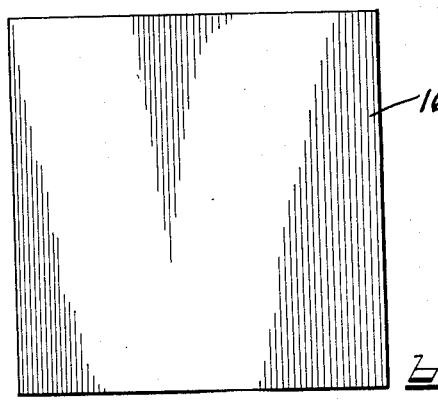
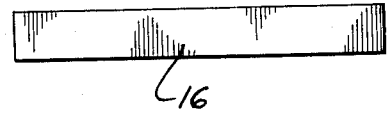
Inventor
GEORGE ALBERT LYON.
by Charles H. Hill Attys.

Oct. 17, 1944.　　　G. A. LYON　　　2,360,354
CARTRIDGE CASING AND METHOD OF MAKING SAME
Filed Jan. 12, 1942　　　4 Sheets-Sheet 2

Inventor
GEORGE ALBERT LYON.
by Charles H. Mills Attys.

Oct. 17, 1944. G. A. LYON 2,360,354
CARTRIDGE CASING AND METHOD OF MAKING SAME
Filed Jan. 12, 1942   4 Sheets-Sheet 3
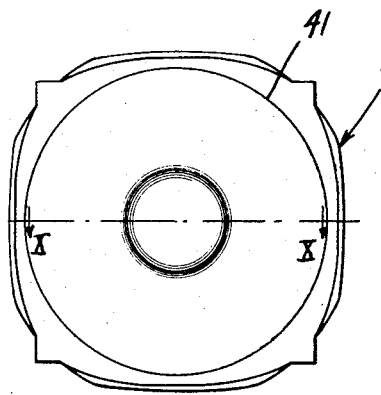
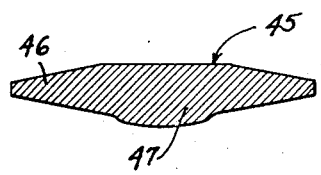
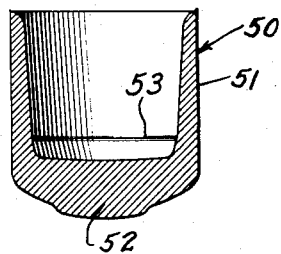
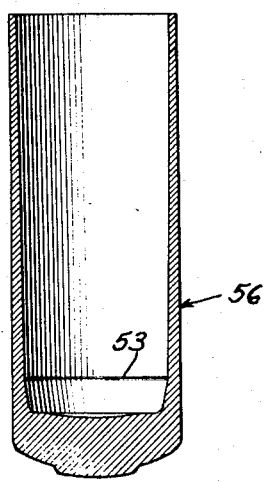
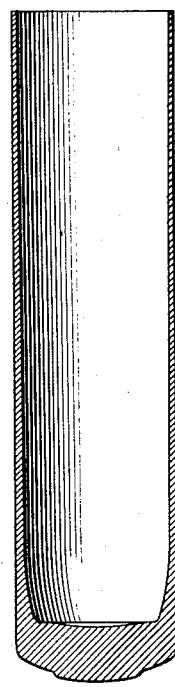
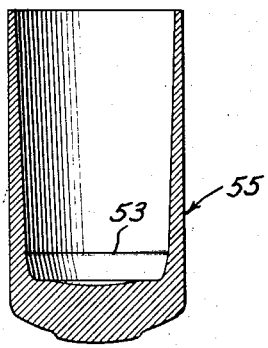
Inventor
GEORGE ALBERT LYON.

Oct. 17, 1944.  G. A. LYON  2,360,354
CARTRIDGE CASING AND METHOD OF MAKING SAME
Filed Jan. 12, 1942  4 Sheets-Sheet 4
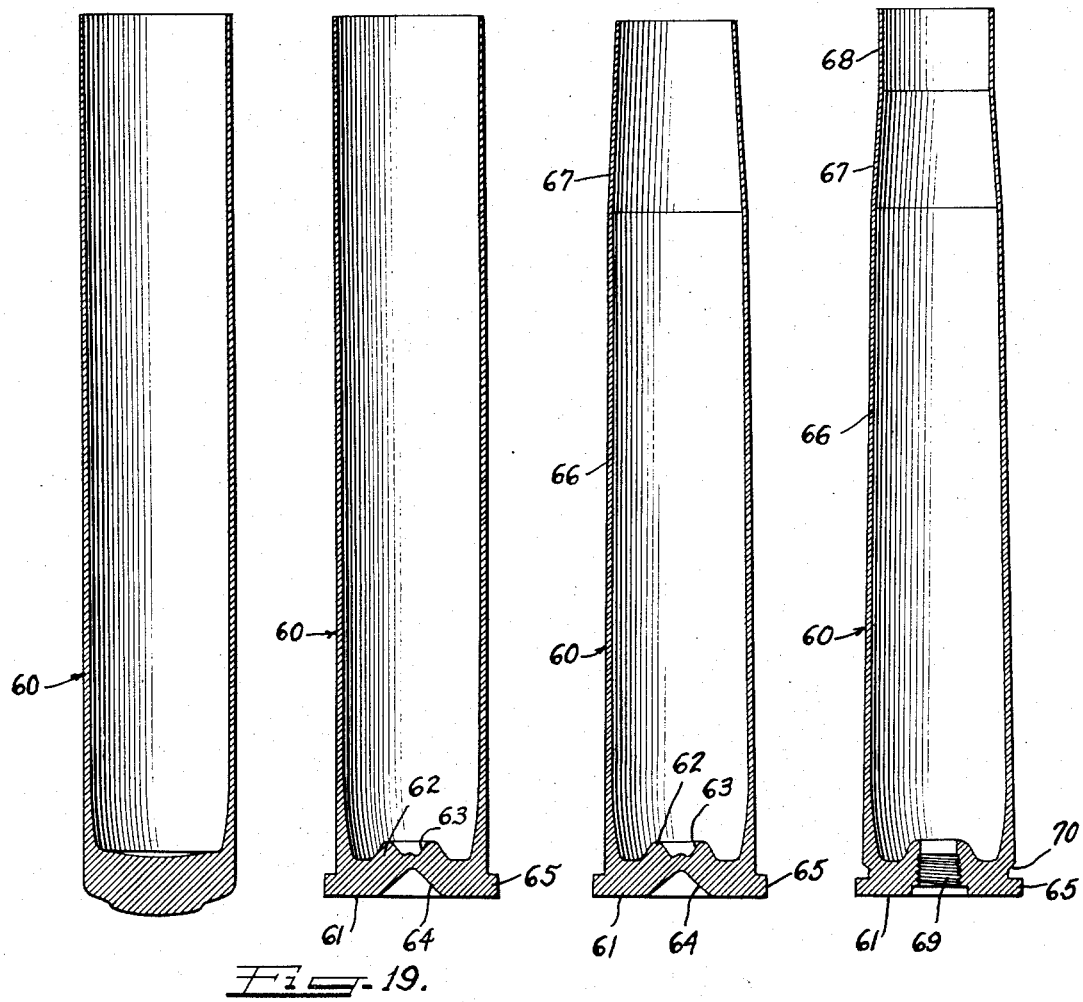
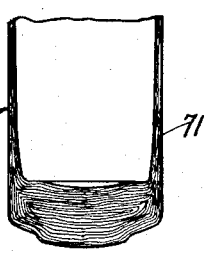
Inventor
GEORGE ALBERT LYON.

Patented Oct. 17, 1944

2,360,354

UNITED STATES PATENT OFFICE 2,360,354

CARTRIDGE CASING AND METHOD OF MAKING SAME

George Albert Lyon, Allenhurst, N. J.

Application January 12, 1942, Serial No. 426,453

5 Claims. (Cl. 29—1.3)

This invention relates to a method of manufacturing cartridge cases or casings. More specifically, the invention pertains to such methods of making cartridge cases as include the steps of initially cutting a plurality of flat cartridge case blanks from a metal slab and thereafter subjecting the cut blanks to cupping, drawing, tapering, upsetting and other forming operations. As will appear more fully hereinbelow, various aspects of the present invention have to do with a number of problems presented by such methods, in particular, when applied to the manufacture of cartridge cases intended for rapid-firing guns characterized by high muzzle velocity, for instance, the 40 mm. Bofors anti-aircraft gun. Among these problems may be mentioned that of minimizing waste of slab material when cutting blanks as well as that of eliminating structural irregularities in marginal blank material originating from the initial slab cutting, blank forming operation and tending to be carried over into the finished cartridge cases, to the great detriment of the latter. Other phases of the invention are directed to features such as the distribution of blank material having proper hardness around the various cartridge case areas in conformance with the local concentration of the stresses encountered on loading, firing and extraction of the cartridge cases. Still another point to be noted is the establishment and preservation of proper crystalline structure of the blank material during the prolonged and severe forming operations effecting the above mentioned distribution of material while carrying out a minimal number of annealing operations. Advances in these and further respects accomplished by the present invention will be made more clear by the following description of conventional methods of making cartridge cases.

Heretofore, in the manufacture of 40 mm. Bofors cartridge casings and the like, it has been the practice to punch out circular flat blanks from slab or sheet material, each blank having a predetermined weight and metal content commensurate with the size of the casing to be made therefrom by subsequent cupping of the blanks and drawing of the resultant cups. Such round blanks can obviously not be punched out contiguously. A network of slab material is left between the punched-out perforations. In particular, when heavy sheet or slab material is used, it is necessary to space each round blank a considerable distance from the adjoining blanks in order to have sufficient remaining material for a hold-down during the cutting through of the thick stock. Thus, from a brass slab 91¾ inches long, 12³⁄₁₆ inches wide and 0.687 inch thick weighing 259.46 pounds 62 round blanks each weighing 2.215 pounds may be punched. These 62 blanks will weigh 137.33 pounds. The part of the slabs left as scrap after the punching operation will weigh 122.13 pounds. In other words, the punched out round blanks amount to only 53% of the original slab material and 47% of the slab material is wasted as scrap.

Actually it has been the practice for the brass foundries to roll brass into slab form, anneal the rolled slabs thoroughly, then punch out the round blanks and anneal the blanks for three hours. Such prolonged annealing is made necessary by the severe working of the marginal blank portions in the punching operation and leaves the blanks with a coarse crystalline structure. The annealed blanks are shipped to the casing manufacturer for further working.

In the previous practice of fabricating cartridge cases, the round blanks have been cut from heavy slab material having a thickness equal to the required bottom thickness of the finished casings. Cartridges for present day anti-aircraft guns are provided with head or closed ends much thicker than the side walls, which are made as thin as possible in order to keep down the weight of the cartridges, for enormous gas pressures are generated within the cartridge cases on firing. The tapered form of the cartridge cases tends to direct the gas pressure against the bottom and base of the casing. Further, the base of the cartridge cases is not supported laterally by the gun bore, which is countersunk to render the cartridge base accessible to ejector fingers. As a consequence, the bottom and base of the cartridge cases must be made thick enough to prevent rupture on firing. When, according to the standard prior art method, round blanks are punched from thick metal slabs, the cutting or punching of the thick slab results in a so-called "drag" on the slab material at the edge being cut, which is made evident by roughness and the presence of slivers of free metal and burrs at the cut edge. The internal structure of the marginal blank portions is also made irregular for some distance inward. These irregularities remain in the margin of the punched out part through all the subsequent cupping and drawing operations. As a consequence, it has heretofore been found necessary to draw out the casing to a length much greater than that desired in the final cartridge and then to cut off between 4 and 5 inches of the open end so as to remove from the casing material characterized by a roughened surface, overlapping seams, and more or less free slivers or burrs of metal. Further, portions of this irregular or rough part of the blank are likely to break off in one of the drawing dies, and may then so damage the casing as to necessitate its rejection. Due to the rapidity with which these casings are drawn on a large production basis, such a broken off piece of metal in the die, if not observed, might easily damage many casings before its presence is detected.

In the so far described previous practice of fabricating cartridge cases from relatively thick sheet metal (which I understand had been recommended for adoption by the present Defense Administration for use in the manufacture of these casings), the first operation after the punching and annealing of the round blank comprises a cupping operation. In this regard, I have noted that, due to the considerable thickness of the round blank, the stock must be subjected to tremendous pressures and strains to bend and draw the round blank into a cup having a thickened bottom and a thin wall. This very harsh working of the metal in the side walls results in a crystal or grain structure oriented vertically in the side walls of the cup. The bottom not being worked so severely, no corresponding structure is established therein. There is therefore established a line of potential structural weakness at the transition from the bottom to the walls of the cup. Not only is the bottom and base material worked less than the side wall material, with consequent lesser hardening of the bottom and base material, but the blank material tends to be concentrated in the bottom, with which the thin side walls merge directly, leaving the base of the side wall around the bottom with insufficient material for withstanding the great strains to which the base will be subjected in the absence of lateral support from the gun bore.

In brief, the standard conventional method includes punching out round blanks from thick sheet material, thereafter cupping the blanks and drawing out the walls of the resultant cups. The disadvantages inherent in this method include a waste of approximately 50% of the thick sheet material; unsatisfactory internal structure in the marginal blank portions requiring excessive drawing out to permit trimming off of the defective portions; severe working of the side walls of the cartridge cases with but little working of the bottom and base portions, where strength is particularly required; establishment of dissimilar grain structures in the bottom and the side wall of the casing; sudden transition from a thick bottom to thin side walls leaving the casing base structurally weak at exactly the area where no lateral support will be afforded by the gun bore; and a great number of cupping and drawing operations as well as annealing operations are required.

The present invention departs radically from the standard method by providing a method including the steps of shearing square blanks from a metal slab thinner than the required bottom thickness of the finished cartridge cases, then coining the square blanks to flow metal having an internal structure affected by the shearing operation outwardly to form a raised edge and to flow other metal inwardly to form a centrally bulging button having margins tapering to the raised edge. The raised edge is then trimmed off from the button, and the trimmed coined blanks are cupped and drawn, the central bulge forming the lower bottom face of the resultant cup. An upsetting operation is then employed to force the bottom material upwardly and outwardly for forming a suitably shaped casing base.

The present invention thus provides round blanks for cupping and subsequent drawing of the resultant cups. But such round blanks are not punched directly from thick slab material, being instead produced from thinner slabs in several steps that utilize the slab material more efficiently to produce a greater number of blanks from a given weight of slab material than can be obtained by conventional methods. The fact that the methods of the present invention utilize thinner slab material is conducive to several advantages. The thinner material can be cut or shorn more easily and without disturbing the internal structure of the marginal blank portions as severely or as extensively as in the standard method. Trimming into round form even without concentration, at the edges, of metal affected by cutting removes thin slab material rather than thick slab material, and therefore saves slab material.

According to the present invention, marginal blank material affected adversely by the initial slab shearing, blank forming operation is removed from the blanks before the blanks are cupped and drawn, not after the latter operations, as in the conventional method. According to the present invention, the blank material trimmed off the blanks to make the blanks round is that marginal blank material which has had its internal structure adversely affected by the slab shearing blank forming operation. The raised edge formed by the coining operation is easily trimmed off without disturbing the structure of metal inside the same, for the coining operation leaves the transition from the tapered button margin to the raised edge brittle. In the prior art, on the other hand, slab material otherwise suitable for cartridge making is wasted by punching out round blanks, such wasted material being left as a network around the punched-out perforations, and the resulting round blanks still have to be marginally trimmed (after cupping and drawing) to remove metal whose internal structure has been adversely affected by the punching operation. Thus the present invention, by trimming off for rounding purposes, only blank material that would have to be trimmed off in any case, effects a great saving in slab material as compared with the standard method involving, in effect, two trimming steps rather than one.

The buttons having tapering margins and a central bulge on one face produced by the coining and trimming steps of the present invention are much better suited for being cupped and drawn into cartridge cases than are the flat blanks of the prior art. When cupped upwardly with the bulge downward, the tapering margins form the side walls of the cartridge cases and the bulging centers form the bottoms. The side walls, being initially relatively thinner than the bottom, need not be drawn so severely as sidewalls of cups made from uniformly flat prior art blanks. Further, the side walls will have an initial taper that facilitates shaping the cases with a gradual rather than sudden transition in thickness from bottom to side walls, thus providing a relatively stronger base portion as compared with prior art cartridge cases. As pointed out hereinabove, the base portion of the cases is that exposed to greatest strain with least lateral support; hence the cartridge cases are most likely to rupture in the base portion.

The coining operation squeezes the blanks marginally to flow material radially inwardly establishing a radial grain structure in the coined blank which is carried over into the cupped and drawn cartridge case where the fibrous structure will radiate from the center of the bottom and extend upwardly through the side walls.

The cupped and drawn blank having the central bulge on its lower bottom face is upset to force the bulging material outwardly for forming the circumferential flange around the end of the finished cartridge case. The bulge material is also formed upwardly to form the central crown in the inner bottom of the cartridge case through which the primer hole is to extend. Thus the metal in the base of the cartridge case is worked and hardened to give the same required hardness. Further, metal on the outside of the bottom of the cupped and drawn blank flows better and is distributed more easily as desired than material serving simply to form a thick bottom, as in conventionally cupped and drawn blanks originally having the form of flat round disks.

An important object, therefore, of the present invention is to provide an improved method of manufacturing cartridge cases of increased strength with less waste of material and with fewer trimming, drawing and annealing operations than in conventional methods.

Another object of this invention is to provide an improved method of manufacturing cartridge cases including the steps of cutting contiguous blanks from relatively thin sheet material, coining such blanks to flow edge material outward and other metal radially inward, and then trimming off edge material to form the blanks into round shape, whereby all the cut or sheared edges are trimmed off so that the ensuing article will contain no metal having an internal structure affected by the blank cutting operation.

A further object of the invention is to provide an improved method of manufacturing cartridge cases utilizing round blanks having a uniform internal crystalline structure radiating from the center of the blank and having tapering margins together with a central bulge on one broad face.

Still another object of the present invention is to provide cartridge cases of improved form and having a hardness and grain structure adapting the cases to withstand the shocks of firing and extraction better than conventional cartridge cases.

A further object of the invention is to provide novel dies for making cartridge cases by methods including coining and squeezing steps.

Still another object of the present invention is to provide an improved method of manufacturing cartridge cases in which the material in the base and bottom of the cases is so distributed and so work-hardened as to provide for the enormously concentrated strains to which the base and bottom of the cartridge will be subjected on firing of cartridges containing said cases.

A further object of the invention is to provide an improved method of manufacturing cartridge cases including novel blank-forming steps and cupping, drawing and upsetting steps coacting to yield a cartridge casing of increased strength with less severe and more widely distributed working of the metal than in conventional methods of making cartridge cases.

Other and further objects and features of this invention will become apparent from the following description of a preferred method according to this invention and the appended claims, taken in conjunction with the accompanying drawings, in which:

Figure 1 is a fragmentary plan view of a metal slab from which round flat blanks have been punched out according to the conventional method of making cartridge cases.

Figure 2 is an enlarged plan view of a conventional flat round blank for a cartridge case.

Figure 3 is an enlarged side view of the blank of Fig. 2.

Figure 4 is a fragmentary plan view of a metal slab cut into contiguous square blanks according to the present invention.

Figure 5 is an enlarged plan view of a square blank for a cartridge case according to the present invention.

Figure 6 is an enlarged side view of the blank of Fig. 5.

Figure 9 is a bottom plan view of a coined square blank according to the present invention.

Figure 10 is a transverse vertical cross section of a trimmed coined originally square blank taken along the line X—X of Figure 9.

Figure 11 is a longitudinal vertical cross sectional view through a cupped or drawn article formed from the button of Fig. 10.

Figures 12, 13 and 14 are longitudinal vertical cross sectional views illustrating the article of Fig. 11 as subjected to a series of drawing operations.

Figure 15 is a longitudinal vertical cross sectional view through the article of Fig. 14 after subjection to a final drawing operation and a trimming operation.

Figure 16 is a longitudinal vertical cross sectional view through the article of Fig. 15 after the bottom has been upset and flattened as well as indented.

Figure 17 is a longitudinal vertical cross sectional view through the article of Fig. 16 after the article has been subjected to an initial tapering operation.

Figure 18 is a longitudinal vertical cross sectional view through a finished cartridge case produced from the article of Fig. 17 by an additional tapering operation, as well as by the operation of head tapping and head flanging.

Figure 19 is a fragmentary vertical sectional view through the article of Fig. 15 showing the grain structure of the article.

Figure 7:
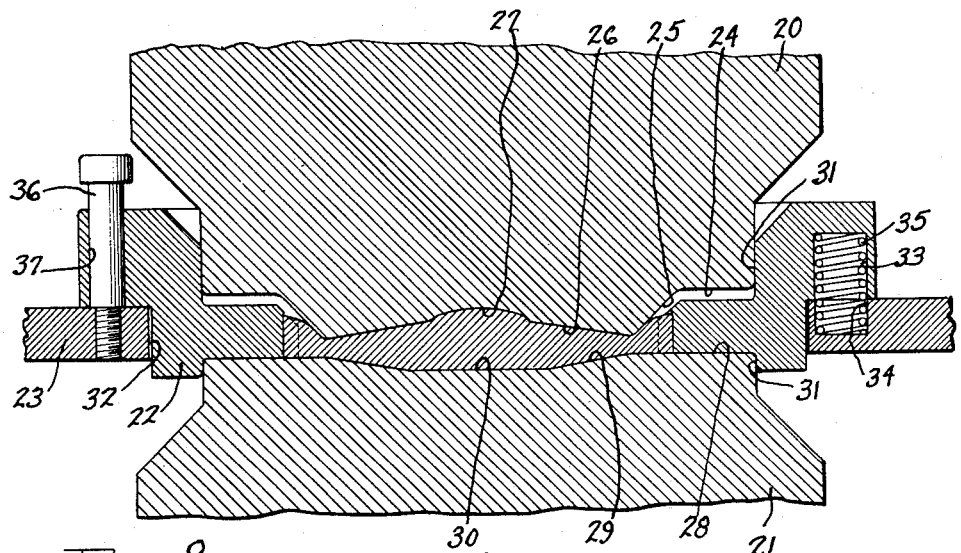
Figure 7 is a vertical cross sectional view taken along the line VII—VII of Fig. 8 and showing a square blank according to the present invention as disposed in a coining die after completion of the coining operation.

In Fig. 1 the reference numeral 10 indicates a brass slab having a thickness equal to the desired bottom thickness in the cartridge cases to be made therefrom by the conventional method of making such casings. Round flat blanks 11 have been punched out of the slab 10. As is clearly evident, the punching out of the blanks leaves a network 12 around the punched-out perforations which, as mentioned hereinabove, amounts to almost 50% of the original slab material. Figs. 2 and 3 are enlarged plane and side views of the punched out blanks 11. Such blanks after having been annealed for 3 hours are conventionally shipped by the brass foundries to the cartridge manufacturers for further working.

In Fig. 4, the reference numeral 15 indicates generally a rolled brass slab having a thickness less than that required for the bottom of the finished cartridge cases to be made therefrom. Such a slab need not be annealed prior to being sheared into contiguous square blanks 16. Shearing, rather than cutting, reduces the "drag" on the sheared edges, since the metal can move away as it is being cut. When punched, the metal is confined by the cutting member and "dragged" across and past the cut edge. Strips 17 of tapering edge material are preferably sheared off when the square blanks are cut, in order to have all blanks of equal thickness. The blanks are shown in enlarged views in Figs. 5 and 6. Such blanks are hard and have a fine grain structure, being sheared from a rolled slab that has not been annealed after the last rolling operation. These square blanks need have their edges only subjected to a selective annealing at 1150° F. for ¾ hour before being coined.

Cast slabs may also be used as starting material. The broad faces of such cast slabs should be made smooth by planing or milling before the square blanks are sheared therefrom.

Figure 8:
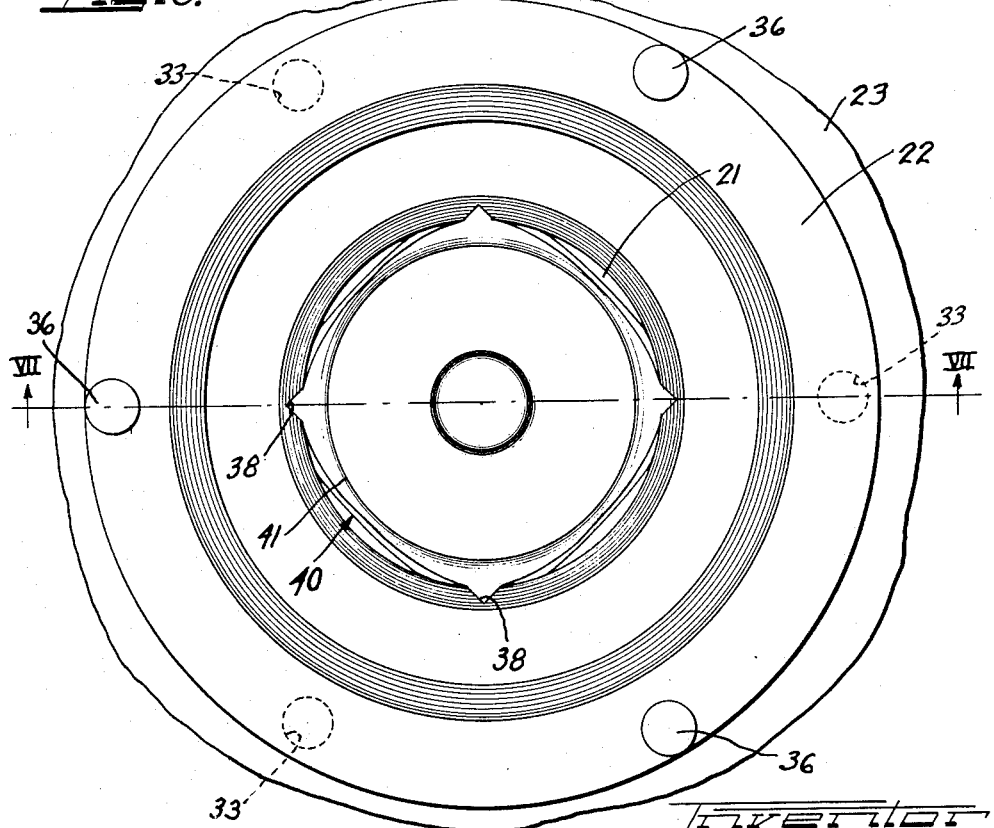
Figure 8 is a plan view of the assembly of Fig. 7 as seen after removal of the male coining die member.

The coining die assembly is illustrated in Fig. 7, and, with the exception of the male die member, in Fig. 8 as well. This assembly includes an upper male die member 20, a lower die member 21, an indexing ring 22 cooperating with the lower die member 21 to form a female die member, and an indexing plate 23 from which the indexing ring is suspended. The male die 20 is generally cylindrical, terminating in a constricted end portion having a round end face including an outer annular flat surface 24 surrounding a frustro-conical annular surface 25 within which an annular surface 26 slopes toward a shallow central recess 27. The lower die member 21 is also generally cylindrical, terminating in a constricted end portion having a round end face equal in size and aligned with the end face of the male die member 20 and formed with an outer annular flat surface 28 coextensive with the surfaces 24 and 25 and a shallow central recess having walls 29 sloping very gently toward a flat bottom 30. The indexing ring 22 is countersunk on both sides to provide surfaces 31 capable of sliding over the sides of the constricted end portions of the die members 20 and 21. The indexing ring is flanged for suspension in an aperture 32 in the indexing plate 23. Registering bores 33 and 34 provided, respectively, in the indexing ring flange and in the indexing plate accommodate coil springs 35 tending to lift the indexing ring away from the indexing plate. Such lifting movement is guided by headed pins 36 screwed into the indexing plate margin around the aperture 32 and extending through close fitting bores 37 in the indexing ring flange, the pin heads limiting upward movement of the indexing ring.

For cooperation with the die members 20 and 21, the indexing ring extends between the surface 28 in the lower die member 21 and the surfaces 24 and 25 on the upper male die member, having its upper inner edge bevelled for avoiding impact thereagainst of the male die member surface 25. At 90° intervals the inner surface of the indexing ring is recessed, as indicated by the reference numeral 38, to receive the corners of a square blank such as the one shown in Figs. 5 and 6. The indexing ring and its recesses are so proportioned that the square blank is wedged fast therein. When the male die member 20 is approximated to the die member 21 and the indexing ring, a square blank being wedged fast in the latter, then the sloping surfaces 26 and 29 bring about an inward radial flow of blank metal filling the recesses in the faces of the die members 20 and 21. At the same time, the marginal blank material between the blank corners is forced radially outward. The resulting metal article is shown in Fig. 9, being designated by the reference numeral 40 and comprising a marginal "flash" portion derived from marginal blank material (including the blank covers). This "flash" portion extends inwardly to a line 41 generated by the edge forming the transition from the frustro-conical surface 25 in the male die member to the sloping surface 26. The article 40 of Fig. 9, when trimmed along the line 41, forms the button 45 of Fig. 10 having tapering margins 46 and a central bulge 47 on one broad face. This button does not contain any marginal blank material whose internal structure has been affected by the original slab shearing, blank forming operation, for all such material has been forced outside the line 41 in the coining operation.

The function of the index plate in the above described coining and trimming operations is to carry the index ring with the blank wedged fast therein from the various operating stations at which, respectively, placing of a blank in the ring, coining and trimming are effected. It should be noted that the index plate carries the index ring and the blank wedged therein as a unit from one station to another. The springs 35 lift the index ring off the die member 21 after the coining operation, when the male die member 20 recedes from the die member 21, the heads of the pins 36 limiting this upward movement of the index ring at a point where the index ring still remains seated in the index plate aperture 32.

Before the button 45 is subjected to a further working, it is annealed so as to compensate for the hardness resulting from the cold working. After the button 45 has been annealed, it is placed in suitable press equipment, central bulge downward, and is drawn into the shape of the cup designated generally by the reference numeral 50 in Fig. 11. In this cup, the tapering margins 46 of the button 45 have been drawn into the wall 51 of the cup and the central button portion including the bulge 47 have been formed into the bottom 52 of the cup. The squeezing or coining operation having established in the coined blank a grain or crystal structure patterned after the spokes of a wheel in that the lines of flow of the crystals extend to and converge at the center of the blank, this same grain structure is carried over into the cup 50, the lines of the grain structure extending from the center of the bottom 52 around and up vertically through the side wall 51 so that the lines of the crystals all extend in substantially the same direction. This eliminates a potential point of weakness at the junction of the side wall 51 with the bottom 52 present in conventionally manufactured cartridge cases.

It should be noted that the inside side wall surface extends straight and with but little divergence from the vertical down to the line 53 in the base region and thereafter extends, still straight, but with slightly less steepness, to the bottom of the cup. The side wall 51 below the line 53 is thus made somewhat thicker than the rest of the side wall, for the purpose of increasing the strength of the cup base.

In Figures 12, 13 and 14 I have illustrated three different conditions of the cupped article as it is progressively subjected to a series of drawing operations for the purpose of elongating the wall to the length desired in the ultimate cartridge casing. The first condition of the cupped article, after it has been subjected to the first drawing operation, is diagrammatically illustrated in Figure 12 and the ensuing product is designated by the reference numeral 55. Likewise, the article obtained after the second drawing operation is diagrammatically shown in Figure 13 and is designated generally by the reference numeral 56. The article 57 of Figure 14 illustrates the results of the third drawing operation. A final drawing operation and a trimming off of the rough free edges of the drawn product yield the tubular cup 60 of Figure 15 having the exact length desired in the finished cartridge case.

Subsequent fabricating operations as evidenced by the changes in the article as shown in Figures 15, 16, 17 and 18 include a flattening or upsetting of the bottom as designated at 61 to form an internal crown 62 indented at 63, an external bottom indentation 64 and a base flange 65. In the next operation, the base and middle side wall portion are tapered as indicated at 66, the top side wall portion being still further tapered as indicated at 67. In the final operation, the extreme outer end of the side wall is straightened out at 68; the bottom of the outside indentation 64 is tapped at 69 to form the primer hole; and the closed end of the casing is grooved at 70 so as to give the flange 65 its final specified shape.

As shown by Figures 11 to 15, the side wall of the case, although drawn repeatedly, has not been subjected to excessive working, for the side wall, as shown in Figure 11, is initially thinner than the bottom and has a tapered form including a thickened base region. The drawing dies are so shaped as to preserve the thickened base throughout the drawing operations, thus forming a gradual and rounded fillet-like transition from case bottom to case side wall, although the line 53 gradually is obliterated as drawing progresses.

The blank material from the central bottom bulge 47 forming the bottom of the cupped and drawn articles is subjected to considerable cold working and hardening when the bottom of the cartridge case is upset and indented to form the internal crown 62 and the external flange 65. However, this material, being disposed on the outside of the cup, is easily accessible to forming tools and can be made to flow relatively freely into desired distribution, the desired internal shape of the case being effected by dies having the appropriate forms.

The internal structure originates in the coining operation and preserved during subsequent forging operations as illustrated in Figure 19, showing a fragmentary section through the article 60. As shown, the fibrous structure extends radially from the center of the case bottom up through the side walls, the lines of crystal flow being indicated by the reference numeral 71.

Unless otherwise specified hereinabove, the article is annealed after each forming operation so that the hardness picked up by the working of the material can be offset before the next operation is carried out. After the final operations, the casing is subjected to a so-called "normalizing" operation at a given temperature for a predetermined length of time to confer on the casing the hardness required by Government specifications. Actually, cartridge cases made as described hereinabove will have a hardness in the head and base region ranging from 115 to 105 Rockwell "F," while the straight open end section has a hardness of from 95 to 87 Rockwell "F" and the short tapered section inside the straight end section has a hardness of from 105 to 98 Rockwell "F."

The cost of making cartridge cases as disclosed hereinabove can be calculated on the basis of the following data. Taking the slab 15 of Figure 4 as 100%, the marginal strip 17 to be scrapped amounts to about 7% including whatever material from the end of the slab may have to be scrapped. A slab 12½ to 12¾ inches wide and from 7 to 10 feet long may suitably be used for cutting blanks 4 inches square and $\frac{7}{8}$ inch thick, a 93% yield of such blanks being obtained. Another 21% of the original slab material is trimmed off the blanks after the coining operation, so that the total amount of wasted slab material is 28% as against the nearly 50% waste of slab material inherent in the prior art method.

The comparative cost of making blanks according to the conventional method and according to the method of the present invention can be computed as follows. 500,000 pounds of standard blanks can be fabricated from 1,000,000 pounds of slab metal, for 21¼ cents per pound, being worth $106,250.00, and 500,000 pounds of scrap being obtained as a by-product. According to the methods of the present invention, 1,000,000 pounds of slab material yield 720,000 pounds of the novel blanks together with 280,000 pounds of scrap. To these 280,000 pounds of scrap another 220,000 pounds, worth $21,175.00 at 9⅝ cents per pound, must be added to have 500,000 pounds of scrap for a new batch. Adding this $21,175.00 to the $106,250.00 cost of the 500,000 pounds of standard blanks gives a cost figure of $127,425.00 for the 720,000 pounds of novel blanks of the present invention, which consequently will cost 17.7 cents per pound. Thus, conventional blanks weighing 2.215 pounds each will cost 47.07 cents each, while the novel blanks each weighing 2.13 pounds will cost 37.70 cents apiece. The saving will be 9.37 cents per blank when operating according to the present invention. Further, since the novel method increases the yield of blanks from any given amount of slab material by 44%, the number of slab cutting, blank forming operations is reduced considerably.

It should be understood that the above described method of making cartridge cases serves merely to illustrate the application of the principles of this invention, which are not limited to the specific example described. Thus, pentagonal or other polygonal blanks can be cut contiguously from slab material and coined in dies having indexing rings with an appropriate number of recesses for receiving the corners of the straight-edged blanks which are then trimmed, cupped and drawn, upset, tapered, and flanged to form the desired cartridge case. The present invention includes generally any and all methods of making cartridge cases comprising, singly or in combination, the steps of coining and squeezing cut straight-edged flat metal blanks cut contiguously from flat metal slabs thinner than the bottom of the desired cartridge case to flow metal whose internal structure has been effected by the blank cutting operation radially outward to form a raised edge and to flow other metal radially inward to form an internal round button having a thickened center bulging on one side and margins tapering to said raised edge and trimming off said raised edge; the step of cupping the resulting button, bulging face down, and drawing out the side walls of the resultant round-bottomed cup as well as flattening and upsetting the round outside bottom of the cup into the form of a cartridge case having a thickened side wall base forming a rounded transition from the side wall to bottom. This invention further includes coining dies having female members comprising a centrally recessed marginally flat faced member forming the bottom of the forming cavity of the female die member and an indexing ring forming the sides of the female die member cavity recessed to receive the corners of the cut blanks in wedged-fast relationship. The invention further includes metal cartridge cases having a grain structure radiating from the center of the bottom to the bottom margins and extending upwardly through the side walls to the free ends, the casings being devoid of metal having an internal structure affected by blank cutting operations. The invention also includes metal cartridge cases having base portions work-hardened to an extent greater than the side walls and formed with thickened side wall bases forming a gradual rounded transition from side wall to bottom. Many details of procedure, form and structure may be varied within a wide range without departing from the principles of this invention, and it is therefore not my intention to limit the patent granted on this invention otherwise than necessitated by the scope of the appended claims.

This application is a continuation in part of my application entitled: "Method of manufacturing cartridge casings," U. S. Serial No. 402,105, filed July 12, 1941.

I claim as my invention:

1. In a process of drawing a metallic cartridge casing, the steps of cutting a square blank from a flat metal slab, confining and holding the four corners of the blank stationary while coining and squeezing said blank so that metal from the corners and edges of said blank is squeezed radially outwardly and upwardly to form a marginal flash portion and other metal is flowed radially inward to bulge and thicken the blank at its center thus forming a button at the center of the blank having margins tapering away from the central bulge to said flash portion and cutting off the marginal flash portion of said blank outside said tapering button margin leaving a circular button.

2. In a process of drawing a metallic cartridge casing, the steps of cutting a square blank from a flat metal slab, confining and holding the four corners of the blank stationary while coining and squeezing said blank so that metal from the corners and edges of said blank is squeezed radially outwardly and upwardly to form a marginal flash portion and other metal is flowed radially inward to bulge and thicken the blank at its center thus forming a button at the center of the blank having margins tapering away from a central bulge to said flash portion and cutting off the marginal flash portion of said blank outside said tapering button margins, leaving a circular button, turning the button over with said bulge on the bottom thereof, cupping the button with said bulge extending downwardly beyond the bottom of said cup, drawing said cup into a shell, and flattening said button into the head end of the cartridge casing.

3. In a process of drawing a metallic cartridge casing, the steps of cutting a polygonal-shaped blank of a given size from a flat sheet of metal, positioning the flat blank between cooperable, aligned die members and substantially wholly within the area encompassed by said cooperating die members, pressing said blank between said die members to flow the metal radially outward between the corners of the blank so that the blank while maintaining the original corner contours is formed into substantially a circular shape between said corners and, at the same time, flowing the metal radially inward at the central portion of the blank to bulge and thicken the blank at its center portion and to thin its marginal portion, and thereafter cupping the blank with the bulged, thickened portion formed into the bottom of the ensuing cup and the thinned portion in the wall thereof.

4. In a process of drawing a metallic cartridge casing, the steps of cutting a polygonal-shaped blank of a given size from a flat slab of metal, coining and squeezing said blank to flow metal radially outward between the corners of the blank so that the blank while maintaining the original corner contours is formed into substantially a circular shape between said corners, and, at the same time, squeezing the marginal portion of the blank to crowd other metal into the center of the blank and thus thicken the center portion as well as to bevel both sides of the blank progressively from the center thickened portion to the thinner marginal portion, and thereafter cupping the blank with the bulged, thickened portion formed into the bottom of the ensuing cup and the thinned, marginal portion in the wall thereof.

5. In a process of drawing a metallic cartridge casing, the steps of cutting a polygonal-shaped blank of a given size from a flat sheet of metal, positioning the flat blank between cooperable, aligned die members and substantially wholly within the area encompassed by said cooperating die members, pressing said blank between said die members to flow the metal radially outward between the corners of the blank so that the blank while maintaining the original corner contours is formed into substantially a circular shape between said corners and, at the same time flowing the metal radially inward at the central portion of the blank to bulge and thicken the blank at its center portion and to thin its marginal portion, trimming away the outer edge of the circular blank so as to cause the blank to have a true circular shape, and thereafter cupping the blank.

GEORGE ALBERT LYON.